United States Patent
Yang et al.

(10) Patent No.: US 11,979,504 B2
(45) Date of Patent: May 7, 2024

(54) BLOCKCHAIN ARCHITECTURE CONFORMING TO GENERAL DATA PROTECTION REGULATION FOR MANAGEMENT OF PERSONALLY IDENTIFIABLE INFORMATION

(71) Applicant: INJE UNIVERSITY INDUSTRY-ACADEMIC COOPERATION FOUNDATION, Gyeongsangnam-do (KR)

(72) Inventors: Jin Hong Yang, Daejeon (KR); Chul Soo Kim, Gyeongsangnam-do (KR); Md Mehedi Hassan Onik, Gyeongsangnam-do (KR); Nam Yong Lee, Gyeongsangnam-do (KR)

(73) Assignee: INJE UNIVERSITY INDUSTRY-COOPERATION FOUNDATION, Gimhae-si (KR)

( * ) Notice: Subject to any disclaimer, the term of this patent is extended or adjusted under 35 U.S.C. 154(b) by 591 days.

(21) Appl. No.: 17/268,389

(22) PCT Filed: Dec. 31, 2018

(86) PCT No.: PCT/KR2018/016969
§ 371 (c)(1),
(2) Date: Feb. 12, 2021

(87) PCT Pub. No.: WO2020/036270
PCT Pub. Date: Feb. 20, 2020

(65) Prior Publication Data
US 2022/0123945 A1    Apr. 21, 2022

(30) Foreign Application Priority Data

Aug. 13, 2018 (KR) ........................ 10-2018-0094513
Oct. 31, 2018 (KR) ........................ 10-2018-0132164

(51) Int. Cl.
| | | |
|---|---|---|
| H04L 9/32 | (2006.01) | |
| G06F 21/62 | (2013.01) | |
| H04L 9/00 | (2022.01) | |

(52) U.S. Cl.
CPC ........ *H04L 9/3247* (2013.01); *G06F 21/6227* (2013.01); *G06F 21/6254* (2013.01); *H04L 9/3236* (2013.01); *H04L 9/50* (2022.05)

(58) Field of Classification Search
CPC ..... H04L 9/3247; H04L 65/40; H04L 9/3236; H04L 9/50; G06F 21/6254; G06F 21/645; G06F 21/6227; G06F 21/6245
USPC ........................................................... 713/16
See application file for complete search history.

(56) References Cited

U.S. PATENT DOCUMENTS

2017/0286717 A1    10/2017  Khi
2019/0208414 A1*   7/2019   Roennow ............ G06F 16/1824
(Continued)

FOREIGN PATENT DOCUMENTS

WO    2017203093 A1    11/2017

OTHER PUBLICATIONS

International Search Report mailed May 8, 2019, issued in corresponding Application No. PCT/KR2018/016969, filed Dec. 31, 2018, 4 pages.
(Continued)

*Primary Examiner* — Benjamin A Kaplan
(74) *Attorney, Agent, or Firm* — CHRISTENSEN O'CONNOR JOHNSON KINDNESS PLLC (57) ABSTRACT

Incidents involving confidentiality and vigilance against user privacy invasions raise doubts as to current third-party data collection procedures. Personally identifiable information (PII) is being abused for medical data breaches, identity theft, spam, phishing, cyber spying, etc. A great amount of data is flowing from users to companies for prediction and
(Continued)

analysis of data-centric markets. It is thus difficult to track PII flow and genuineness. Blockchain technology, which is an "immutable" distributed ledger, can efficiently track PII exchange, storing, and distribution. In contrast, the EU general data protection regulation (GDPR) in progress claims "a right to forget" and a right "to delete". However, the present specification proposes an off-chain blockchain architecture using both a local database and a distributed ledger to guarantee a trustable PII life cycle.

13 Claims, 8 Drawing Sheets

(56) References Cited

U.S. PATENT DOCUMENTS

2020/0193441 A1* 6/2020 Mokhasi ............ G06Q 20/4012
2020/0327254 A1* 10/2020 Abilash ............... G06F 21/6254

OTHER PUBLICATIONS

Lee, S., et al., "A Study on Blockchain Data Design Considering Personal Information Protection," Proceedings of 2018 Korean Institute of Communications and Computer Sciences Summer Conference, Jan. 2018, pp. 478-479.

Limo, PhD., Claudio, "Blockchain-GDPR Privacy by Design: How Decentralized Blockchain Internet will Comply with GDPR Data Privacy," IEEE Blockchain Standards, Jul. 2018, pp. 1-5.

Oh, H., et al., "A Study on GDPR Compliant Blockchain based Personally Identifiable Information Management Framework," GDPR, Proceedings of 2018 Korean Institute of Communications and Information Sciences Summer Conference, Jun. 2018, pp. 1186-1187.

* cited by examiner

| Encoded Block Data |
| --- |
| SawSdJw587Wee620SloGGE84SSd9asdw976kJSDwkasd973Sjffnsmasdh55dfr8a4ASDddw87Sd12SDW7dw65338asdef7SD7Sdw752sdffaW84wWfC55awwKSDWi21Gd7EW6SdwwW4w |

| User | Controller | Processor | Terms and Conditions | NPII |
| --- | --- | --- | --- | --- |
| User_ID_1 | Controller_ID_1 | Processor_ID_1 | Erase data after 6 months. Data scope only in Korea. Need consent for sharing. Notify breaching within 72 hours. Right to Access. | - User_ID_1: macOS 10.13.4<br>- Controller_ID_1: English, UTC+9<br>- Processor_ID_1: Brower Cookie |

BLOCKCHAIN ARCHITECTURE CONFORMING TO GENERAL DATA PROTECTION REGULATION FOR MANAGEMENT OF PERSONALLY IDENTIFIABLE INFORMATION

TECHNICAL FIELD

The present disclosure relates to blockchain architecture complying with general data protection regulation for personally identifiable information management.

BACKGROUND ART

In order to provide user-driven service, a web site collects a large amount of PII (e.g., an age, a race, a social security number, a home location, and a driving license). Today fifty million people or more use several social network services (SNS). A large amount of PII is provided to these sites. Such all SNS sites, other web sites and mobile applications provide login or registration for premium service. PII is frequently used to authenticate a customer's identity in an organization. Since most of such SNS sites and applications are free of charge, a PII breach in organizations was discovered through several researches. Actually, such organizations store, distribute and analyze important PII information in order to generate a business model through user profiling. Technology large companies use third party services, that is, companies that provide customer PII. Eventually, such assistant organizations collect, analyze and distribute data from several organizations. As a result, a user is unaware of a point at which data is ended. We all enjoy advantages of the data-driven industry, but the illegal use of PII is the dark side of the data-driven industry. Guardian revealed on April 2018 that Facebook, that is, the largest SNS site, has breached 87 million pieces of personal information and PII of users. Constant data breach accidents occur in the big data era mentioned in several researches. According to Armerding, data breaches occurred in different organizations, such as Yahoo (3 billion), eBay (14.5 billion), Adobe (38 million people), JP Morgan (76 million people), and United States Human Resources Administration (22 million people). According to the breach level index (BLI) of Gemalto, leaks of 4 million people occurred every year. Among them, 74% was identity theft. Forbes magazine stipulated data as new currency for trade marketing. It was reported that about $200 million is invested in order to exchange PII. Companies exchange customer data in order to make a profit. It is scheduled that communication between companies will be widely applied. For this reason, PII management and tracking needs to be considered.

The blockchain technology receives a lot of attention from several researchers and is used beyond the cryptocurrency field. The blockchain consists of a series of blocks. The blocks can accommodate any data in their blocks like the existing open ledger. Furthermore, the blocks are interconnected and protected using enciphering. Some researchers use the blockchain for PII management. However, a motive for recently enforced General Data Protection Regulation (GDPR) is to protect personal information, and thus an organization needs to devote its special attention to personal consensus and data sharing. It is necessary for an organization to obtain a consensus before personal data is analyzed, and the organization is responsible for independently retracting or delete such data (so-called "rights to be forgotten"). Blockchain PII storage architecture is based on the "invariability" of data. In contrast, General Data Protection Regulation (GDPR) requires that personal information needs to be changed and deleted in response to a request from a data owner.

DISCLOSURE

Technical Problem

In order to guarantee a reliable PII life cycle, there is provided off-chain blockchain architecture using both a local database and a distributed ledger.

Technical Solution

A personally identifiable information management method of a blockchain based personally identifiable information management system (BcPIIMS) includes splitting, by a controller node on a blockchain network, user personal data received from a user node into personally identifiable information (PII) and potential personally identifiable information (PPII); storing, by the controller node, the personally identifiable information in a local database of the controller node; generating, by the controller node, a hash value of the personally identifiable information; and when a consensus between nodes on the blockchain network is built, generating a block including a smart contract generated based on the consensus, the potential personally identifiable information, the generated hash value, a user identifier corresponding to the user node and a controller identifier corresponding to the controller node, and storing the block in a blockchain.

According to an aspect, the personally identifiable information management method may further include posting, by the controller node, a list of the user personal data for the nodes on the blockchain network.

According to another aspect, the personally identifiable information management method may further include notifying, by the controller node, the user node of whether to share the user personal data and an object of sharing the user personal data if the controller node shares the user personal data with a processor node on the blockchain network.

According to still another aspect, the processor node may be implemented to split the user personal data into the personally identifiable information and the potential personally identifiable information, store the personally identifiable information in a local database of the processor node, generate the hash value of the personally identifiable information, and generate the block, including the smart contract generated based on the consensus, the potential personally identifiable information, the generated hash value, the user identifier corresponding to the user node, the controller identifier corresponding to the controller node and the processor identifier corresponding to the processor node, and store the block in the blockchain, when the consensus between the nodes on the blockchain network is built.

According to still another aspect, a condition for the consensus may be based on General Data Protection Regulation (GDPR).

According to still another aspect, each of the nodes on the blockchain network may confirm the smart contract stored in the blockchain when a request to delete the user personal data is received from the user node, and may delete the user personal data of the user node stored in its own local database.

According to still another aspect, each of the nodes on the blockchain network may confirm the smart contract stored in the blockchain when a request to modify the user personal data is received from the user node, and may modify the user personal data of the user node stored in its own local database. A node that has modified the user personal data of the user node in its own local database may generate a new block including a hash of the modified personally identifiable information and may add the new block to the blockchain.

According to still another aspect, the consensus may be performed when the consensus between nodes of n (n is a natural number) percent or more among all the nodes on the blockchain network is built.

There is provided a computer program coupled to a computer device and stored in a computer-readable recording medium in order to execute the personally identifiable information management method in the computer device.

There is provided a computer-readable recording medium on which a computer program for executing the personally identifiable information management method in the computer device is recorded.

A computer device corresponding to a controller node on a blockchain network includes at least one processor implemented to execute an instruction readable in a computer. The at least one processor splits, into personally identifiable information (PII) and potential personally identifiable information (PPII), user personal data received from a user node on the blockchain network, stores the personally identifiable information in a local database, generates a hash value of the personally identifiable information, and when a consensus between nodes on the blockchain network is built, generates a block including a smart contract generated based on the consensus, the potential personally identifiable information, the generated hash value, a user identifier corresponding to the user node and a controller identifier corresponding to a controller node, and stores the block in a blockchain.

Advantageous Effects

A reliable PII life cycle can be guaranteed by using both a local database and a distributed ledger.

MODE FOR INVENTION

The present disclosure may be modified in various ways and may have various embodiments. Hereinafter, specific embodiments are to be described in detail based on the accompanying drawings.

In describing the present disclosure, a detailed description of a related known function or configuration will be omitted if it is deemed to make the gist of the present disclosure unnecessarily vague.

A question for a third party data collection procedure is raised due to the monitoring user privacy and a secret breach incident. A large amount of personally identifiable information (PII) is abused due to a medical accident, an identity theft, spam, phishing and cyber attack. For data-driven market analysis and prediction, a large amount of data flows from a user to a company. Accordingly, it is difficult to track a flow and authenticity of PII. The blockchain technology is an "invariable" distributed ledger capable of efficiently tracking the exchange, storage and distribution of PII. Contrastively, EU General Data Protection Regulation (GDPR) in progress requires "rights to be forgotten" and "needs to be deleted." However, embodiments of the present disclosure propose off-chain blockchain architecture that guarantees a reliable PII life cycle using a local database and a distributed ledger. Dominant blockchain architecture has been modified by considering a core element of GDPR. A proto type for verifying the proposed architecture was generated using Multichain 2.0. The proposed architecture stores PII and non-PII at physically separated locations. Finally, personal information protection and severity of the blockchain along with personal information protection regulation of GDPR are guaranteed for a user of the proposed architecture. Verification is performed by comparing the proposed system with the existing methodology in a technical aspect. A future research subject is suggested.

1. Introduction

Embodiments of the present disclosure propose a blockchain based personally identifiable information management system (BcPIIMS) designed for PII management for the purpose of all organization ails. A separate procedure for storing PII and the remaining data is proposed. In embodiments of the present disclosure, PII is stored in a local database, and non-PII having a hash of PII is stored in blockchain. In order to verify performance of the proposed model, a proto type was developed. A research direction for raising the recognition of PII management will also be described. The proposed method provides a transparent and invariable system using the blockchain technology in an aspect, and may delete PII of a local database, which is separately stored, anytime in another aspect. As a result, the proposed blockchain based personally identifiable information management system (BcPIIMS) may comply with GDPR.

2. Related Research

There are some solutions and regulations for protecting and tracking PII. In order to protect privacy, major countries and large companies started to enforce their rules. Proprietary validation of a software level operating in an open authorization (OAuth) protocol was proposed. In relation to the aforementioned problem, some researchers have performed research for reducing a PII breach or tracking a flow of user PII. Weingärtner found out a risk factor of PII using a data mining scheme. Brill found out the following three major factors for a privacy leak of a big data final user. a) A risk of information that leaks in a cloud, b) A data leak attributable to the collection of more information than actually required, and c) Data that leaks due to a data distribution for analysis. Alduaij analyzed several identity management schemes chiefly based on privacy regulations. General Data Protection Regulation (GDPR), a privacy protection amendment based on Australia information, Canada personal information protection, and ISO27001 of ISO are executed to protect and manage a data flow. In privacy, in some researches, a digital identifier was identified as a source for a user identifier. Pfitzmann and Hansen have defined PII "identity is a lower set of all of personal attribute sets and can sufficiently identify a corresponding person within the set of all persons." National Institute of Standards and Technology (NIST) defines PII as "all types of other information which are connected or may be connected to a person, such as information personally maintained by an agency, information (e.g., a name, a social security number, a date of birth, a mother's maiden name before marriage or biometrics record) which may be used to identify or track the identify of a person, and medical, educational, financial and employment information." Some PII is listed in Table 1.

TABLE 1

Personally Identifiable Information (PII)

Full Name, Home or Office Address, Email, National Identification Number, Passport, Vehicle ID, Driving License, Fingerprints, Handwriting, Credit Card Numbers, Digital Identity, Birth date, Birthplace, Biological Information, Phone Number, Login Name, Social Security Number (SSN)

Due to an increase of security breaches related to PII, millions of pieces of information have leaked for the past several years. A PII risk is dangerous to all organizations and persons. Privacy based on the design was mentioned in some researches for safely managing PII. Posey performed a task for classifying systematic PII breaches using text mining and cluster analysis. In this research, eight types of major PII leak types were found. In contrast, Non-Personally Identifiable Information (NPII) is a form of PII which may be shared and does not have a risk. The first venture of blockchain is a (Bitcoin) white paper of Satoshi Nakamoto which is fast and cheap and suggests transparent P2P transactions. Technical terms frequently used in the blockchain technology are as follows.

Node: a node is a computer device owned by a participating organization or user. A major activity of a node is to check transactions with another node before a block is added.

Consensus algorithm: a consensus is an algorithm used to approve all decisions required by a node.

Block: after a successful consensus, data containing information on transactions or decision making is added to a current chain as a block.

Blockchain was used for ID management in several other researches. However, the newly assigned EU-GDPR introduced a series of new regulations capable of giving a direct influence on a method of storing PII in previous researches. Joshi combines data privacy and protection ontology, and the blockchain technology. This research suggested a Linkshare system specifically designed for big data, which enables a user to apply customized regulations. In other researches, the blockchain technology was used for PII storage. Benhamouda used multiparty computation (MPC) and a hyper ledger in order to store sensitive information. Zyskind generated a platform that provides personalized user-driven service by combining blockchain using an access control consensus mechanism. Chen described a framework based on cloud privacy, which is managed by blockchain. This method suggested data tracking and access to healthcare resources after an approval procedure.

GDPR went into effect as new privacy regulations of EU on May 25, 2018. GDPR includes that all companies, organizations and persons outside EU must observe the regulations if data of an EU resident is handled. According to recent survey performed on about 2,000 IT experts within England, only 47% of respondents sufficiently recognized GDPR, whereas 41% thereof responded that more understanding was necessary although they were aware of GDPR, and 9% responded that they never recognized GDPR. GDPR classifies data processing organizations into a controller and a processor. The controller and the processor are defined as follows.

Controller: the controller is a corporate body or public organization that processes PII for the citizens of EU or member nations thereof.

Processor: the processor is a corporate body or public organization that processes PII information instead of the controller.

3. Proposed Method

In this section, a proposed methodology for the privacy blockchain based PII management system (BcPIIMS) is described. First, a structural outline and function characteristics of the proposed method are discussed. The final part provides detailed use example scenarios for detailed use.

A. Proposed Architecture

Figure 1:
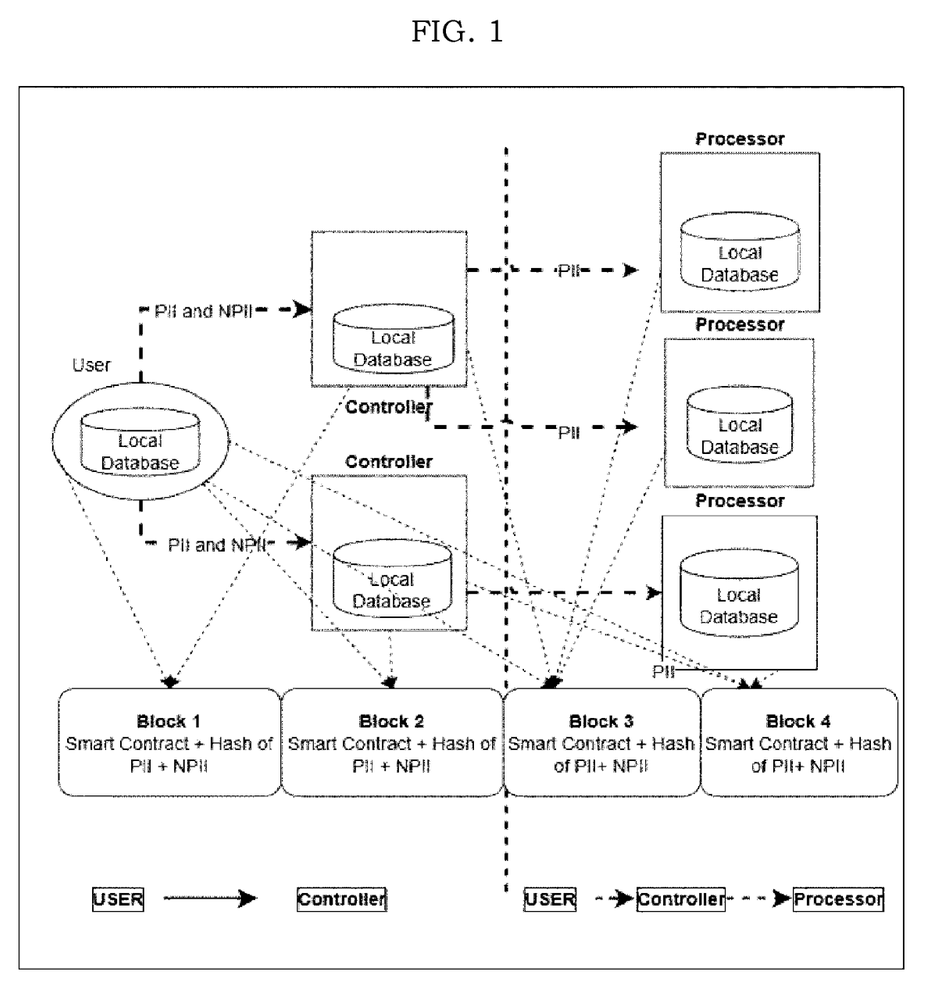
FIG. 1 is a diagram illustrating an example of general architecture of all structures of a system proposed according to an embodiment of the present disclosure.

FIG. 1 is a diagram illustrating an example of general architecture of all structures of a system proposed according to an embodiment of the present disclosure. The system according to the present embodiment chiefly processes predefined three parts of GDPR, that is, a user, the controller and the processor. The proposed system provides a safe, transparent and GDPR-friendly PII management system. A node and a consensus algorithm are as follows.

Node: a user, the controller and the processor are three node types used in the present embodiment. In general, PII data flows between the three node types. Furthermore, it is assumed that blockchain nodes are present within a legal boundary of GDPR.

Consensus algorithm: the present embodiment uses a round robin (consensus algorithm) scheduling system. In this system, a node (a user, the controller and the processor) allowed to generate a valid blockchain needs to generate a circulation block. For the robustness of the system, diversity of mining is set to 0.75 in output from 0 to 1. That is, if a new block is approved as blockchain, at least 75% of all nodes need to agree on or respond to the new block. In this case, if a minor set becomes an inactive state for a long time, the system does not stop. An overall task procedure is as follows.

First, a user vastly produces PII and NPII every day while using several services provided by several organizations. In general, an organization collects PII in order to provide service or market analysis and prediction. The proposed system delivers a list of $\rho$, that is, PII, or $\sigma$, that is, NPII, from a user $\mu$ to controllers $\alpha_{1-n}$. While information flows from $\mu$ to $\alpha$, a smart contract between $\alpha_{1-n}$ and $\mu$ is signed. We mentioned that GDPR does not allow $\rho$ to be preserved in blockchain β. Accordingly, the proposed system was designed in a manner that β stores only σ obtained from μ. In contrast, the smart contract η and a, and all pieces of other information except the PII are stored in a local database Ω of each of nodes (μ and α). Terms and conditions between the two parties (μ and α) are signed as the smart contract η. In this case, data privacy regulation, data using practices, a data distribution procedure, a notification process, mining technology, etc. are mentioned in detail. As another method, a consensus between the nodes (μ and α) will guarantee the generation of a new smart contract η. η may be added to β as a new block (except the PII). A hash € of the local database may also be added to a new block of the blockchain as a record of a data flow.

That is, the PII of the user is stored in an off-chain local database of the controller. Likewise, the blockchain stores the remaining information using a hash of the PII stored in the local database. If the local database is changed on the controller side, the user can easily identify such a change. Likewise, although a PII breach occurs, a set of responsible controllers can be easily identified. Accordingly, as follows, if a list the PII is transferred from all users to a controller data repository, Local database Ω={ρ}, and
Blockchain β={η, σ, €, μ, α}.

Second, the controller uses some other processors for detailed analysis, market forecasting, profiling, business model generation, consumer estimation, etc. Accordingly, the controller a needs to provide a processor $€_{1-n}$ with a list of ρ, that is, the PII of the user μ. In this case, all the nodes (μ, α and €) go through a consensus. As in the previous procedure, the blockchain stores all pieces of non-PII information and a hash of the PII. In contrast, the local database of each of the nodes (μ, α and €) stores the user PII, and transmits the hash of the corresponding PII to the blockchain. That is, when all the parties agree on a data sharing condition, a new block is added to the existing blockchain having the hash of the shared PII and the NPII. Accordingly, as follows, when the list PII is delivered from all the controllers to the data repository of the processor, Local database Ω={ρ}, and
Blockchain β={η, σ, €, μ, α, €}.

In this case, as illustrated in FIG. 1, if a successful consensus is performed between the user and the controller, the new block may be added. Likewise, in the case of the processor, a block may be added only after a successful consensus from the user, the controller and a related processor.

B. PII from User to Controller
1) Personal Data Processing

A user will share personal data with a controller. The controller may split such data into PII and NPII in order to perform a separate storage mechanism. Thereafter, as illustrated in FIG. 1, the controller stores the PII in a local database, then generates a hash value of the shared PII, and stores the PII in blockchain after a consensus is built. Thereafter, a list of the data (PII, NPII) along with the hash value and terms and conditions will be posted between nodes.

Accordingly, consensus information related to the terms and conditions of the user is transparently and explicitly managed.

2) Consensus and Smart Contract:

Terms and conditions for using personal information of a user along with a user consensus are generated in a smart contract. Such a condition needs to observe GDPR or a similar data sharing rule and regulation.

3) Add New Block to Blockchain:

The third step is to generate a block, including the smart contract, the NPII and the hash value of the PII, and to add the new block to the blockchain.

C. PII from Controller to Processor
1) Personal Data Sharing

A controller shares user personal data with a processor connected thereto, and notifies a user of such an update and the processor of an object of sharing data. The processor may split the user personal data into PII and NPII, and may individually store the PII and the NPII. Thereafter, this data will be posted between all nodes.

2) Consensus and Smart Contract

All the nodes need to write a new smart contract that includes terms and conditions and a consensus of the user for the use of the personal information. After the processor agrees on all the conditions provided by the controller and the user, the processor may allow the processing of the PII for data analysis.

3) Generate New Block

After all the steps are finished, in the final step, a new block is generated. The new block includes all of the smart contract, the NPII and a hash value of the PII. Thereafter, the new block is added to the existing blockchain.

D. Personal Information Sharing Scenario of User

Use example scenarios are described in detail. Three scenarios of a user-controller scenario, a user-controller-processor scenario, and a scenario deletion and modification were added.

1) User-Controller Scenario

Figure 2:
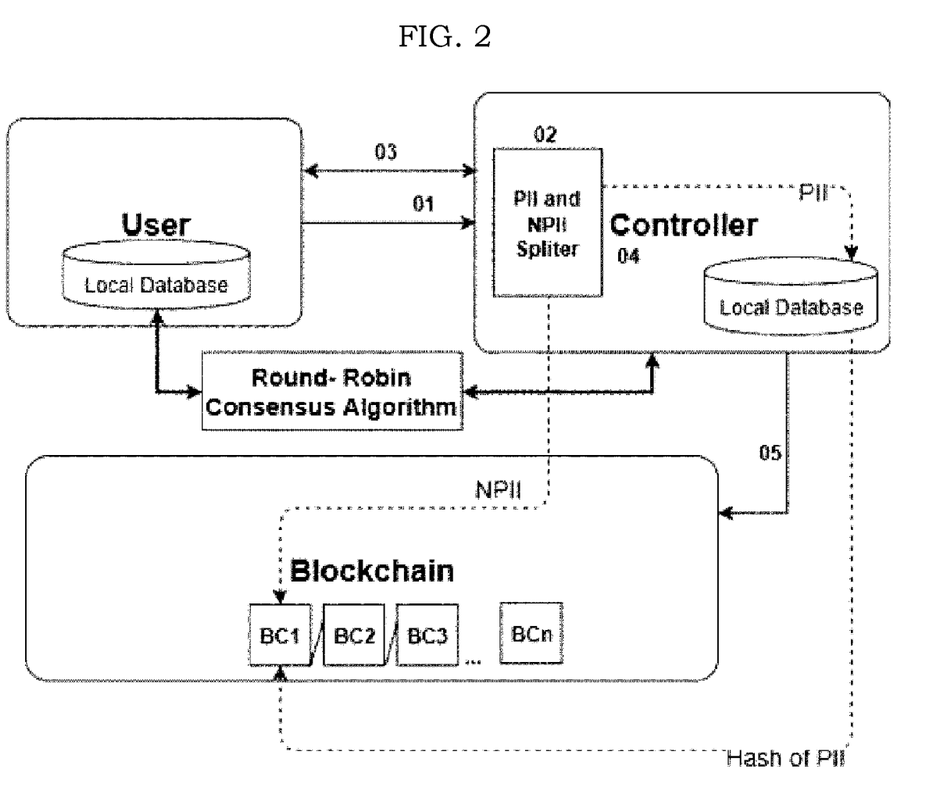
FIG. 2 is a diagram illustrating an example of a user and controller scenario in an embodiment of the present disclosure.

FIG. 2 is a diagram illustrating an example of the user and controller scenario in an embodiment of the present disclosure. In a first process 01, a user provides information to a controller. In a second process 02, the controller splits the data into PII and NPII, and generates a hash value of the sharing PII. After the data is split, in a third process 03, a data list (PII, NPII) along with the hash value will be posted between the nodes. Thereafter, in a fourth process 04, a consensus for terms and conditions and a consensus of the user will arrive between users. The controller and such a consensus need to be able to be compatible with GDPR regulation in order to become a smart contract. Finally, in a fifth process 05, the controller generates a block including all the information (the smart contract, the NPII and the hash value of the PII), and will add a new block to a current blockchain. In order to add the new block 1, as illustrated in FIG. 2, a consensus from both parties of the user and the controller is considered.

Figure 3:
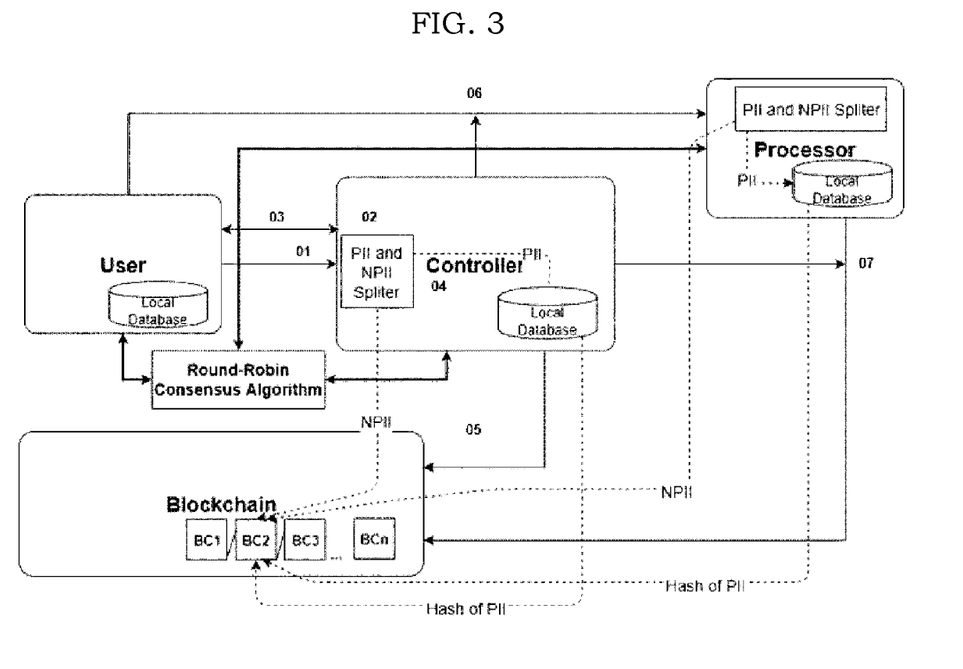
FIG. 3 is a diagram illustrating an example of a user, controller and processor scenario in an embodiment of the present disclosure.

2) User-Controller-Processor Scenario:

FIG. 3 is a diagram illustrating an example of the user, controller and processor scenario in an embodiment of the present disclosure. After the user-controller scenario of FIG. 2, in a sixth process 06, the controller may share PII with a processor for user data analysis. After the PII and the NPII are split, the processor notifies the user of such a split. The user, the controller and the processor reach a consensus. Thereafter, in a seventh process 07, a data list (PII, NPII) along with the hash value may be posted between the nodes. The consensus may be converted into a smart contract and newly stored in the blockchain. As illustrated in FIG. 3, in order to add the block number 2, a consensus from all the parties may be considered.

3) Deletion and Modification Scenario

Figure 4:
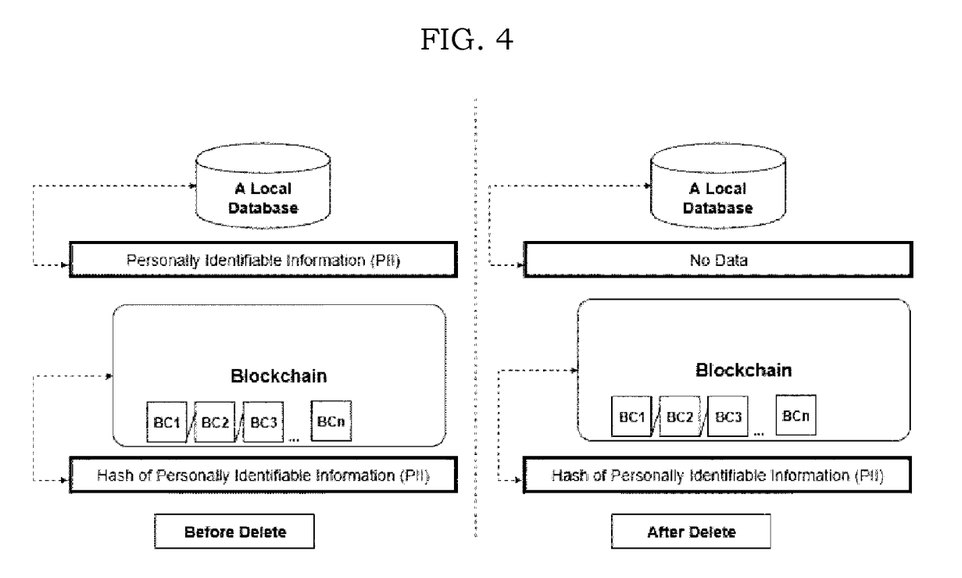
FIG. 4 is a diagram illustrating an example of a scenario in which PII is deleted in an embodiment of the present disclosure.
Figure 5:
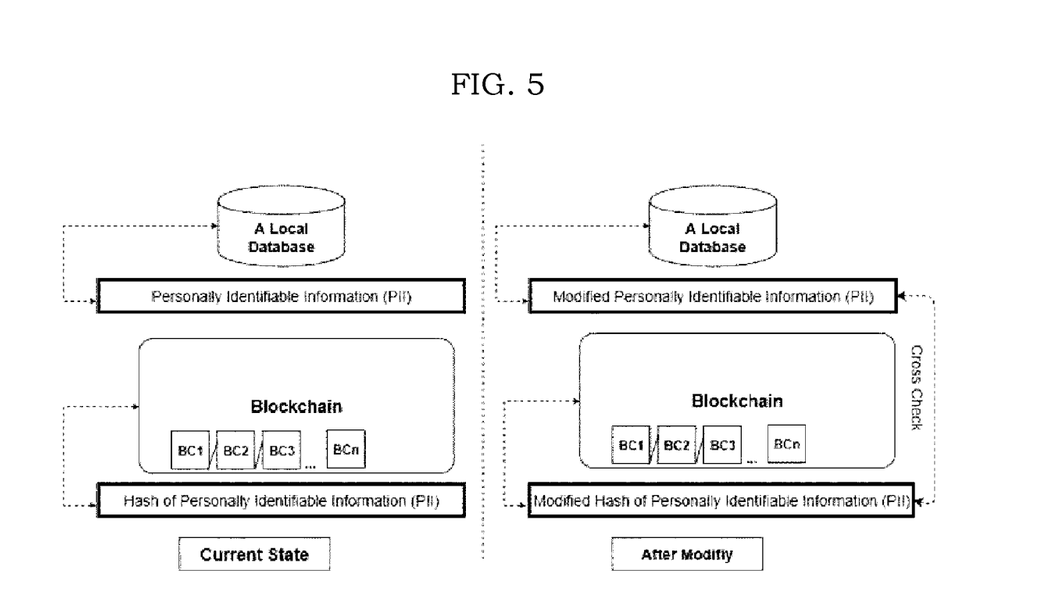
FIG. 5 is a diagram illustrating an example of a scenario in which PII is modified in an embodiment of the present disclosure.

FIG. 4 is a diagram illustrating an example of a scenario in which PII is deleted in an embodiment of the present disclosure. FIG. 5 is a diagram illustrating an example of a scenario in which PII is modified in an embodiment of the present disclosure.

A user may notify all nodes of the need to delete/modify his or her own personal data from a database. All the nodes may confirm a smart contract for a consensus between all nodes stored in blockchain and the user. Thereafter, each of all the nodes may delete/modify the data of the user. At this time, a list of the deleted/modified data (PII, NPII) along with a hash value may be posted between the nodes. As illustrated in FIG. 4, since a hash of the blockchain is not changed, the hash is the same, but actual data no longer exists. Accordingly, a hash not including actual data is useless. Accordingly, the proposed system is matched with GDPR regulation for data deletion. In the case of modification, as illustrated in FIG. 5, after a modification is completed in a local database, the modified PII may be updated into the blockchain as a new block including a hash of the modified PII. The user may cross-check a modification of the user personal data by comparing a hash of the PII stored in the local database with a hash of the blockchain data.

IV. Implementation and Discussion

In this section, an implementation of the proposed system is proposed, and some advantages based on a comparison with the existing PII management and protection system are described.

Figure 6:
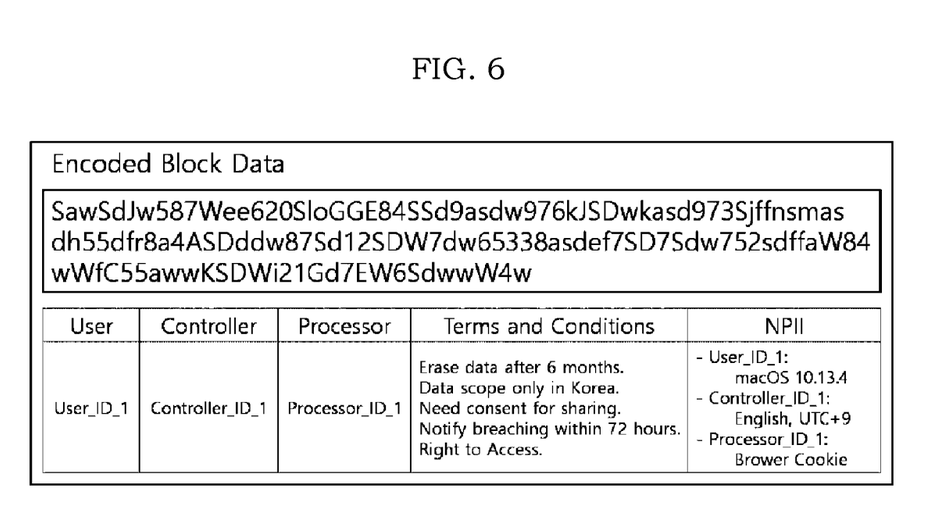
FIG. 6 is a diagram illustrating an example of a comparison between blockchain data and actual data in an embodiment of the present disclosure.

1) System Implementation:

We implemented a proto type of the proposed system in 10 computers (Windows 10, i7-7700HQ CPU @ 2.8 GHZ Samsung Inc. in Korea). The computers represent different participation entities, such as a user, a controller and a processor. In this case, Multichain 2.0, that is, an open source blockchain implementation platform, may be used. The proposed method architecture is a privacy blockchain that requires the least difficulty in order for a network consensus to be achieved. The blockchain, along with the participants (round robin), maintains reliability of a third level. Nodes may be defined or restricted. Nevertheless, mining diversity is set to 0.75, and incorporates a multichain implementation guideline. An example of the proposed system data storage (blockchain data vs actual contract) is illustrated in FIG. 6.

2) Discussion:

Architecture differences obtained in this research and corresponding advantages are described.

a) Storage

The proposed method directly provides a user's data copy from a controller to the user, and provides the user with a hash value of the data. Accordingly, the user may confirm and compare the two hash values (e.g., one user has one hash stored in blockchain). Finally, data veracity is guaranteed through this procedure.

b) Deletion and Modification

A user has rights to delete personal data in a controller and a processor whenever the user wants. GDPR permits "rights to delete." That is, the user may modify or delete PII through new regulations. In order to observe GDPR, the proposed BcPIIMS architecture may allow the user to modify and delete personal data. A simple scenario is illustrated in FIGS. 4 and 5. Open chain data may be deleted, and an on chain in which a hash of the PII and NPII are stored is permitted. Accordingly, this is a method of fully observing GDPR by the proposed system.

c) Security

A consensus between a user, a controller and a processor is safely stored in blockchain, and thus the consensus cannot be changed or altered. Accordingly, the user can be convinced that the consensus is safe and cannot be modified by adding or removing a specific rule through "data invariability" of blockchain. If a given controller attempts to distribute PII or NPII-related information, a new consensus from all the persons directly involved is necessary. Overall security of user PII can be certainly increased because the user can be transparently aware of data stored by a controller and a processor.

d) Transparency and Verification

The proposed system needs to give a user an assurance on that all things related to his or her own data are transparent, a reason for using his or her data, for whom the personal data is necessary, and with whom the data is shared. The user needs to be notified of such all pieces of information from first to end. Furthermore, a rule for a consensus needs to be understood by all the persons directly involved, and needs to be easily accessed and supported.

As described above, some core contributions according to embodiments of the present disclosure are as follows.

First, after information is shared from a user to a controller or a processor, the proposed proto type may successfully track all types of data manipulations. The reason for this is that the proposed architecture maintains a hash of all PII data present in an invariable blockchain after a consensus from all the persons directly involved. If the controller or the processor modifies user PII, the user may easily recognize a change and take necessary measures.

Second, a user can easily predict a controller or a processor whose data is infringed. The user may share his or her PII with another. As a result, the user may charge a corresponding controller and processor with a PII breach. Hereinafter, some advantages of the proposed BcPIIMS are described.

Finally, the proposed system provides an additional data tracking and security enhancement function for using the blockchain technology along with a partial off-chain data storage mechanism. A common data storage mechanism technology considers a condition related to data as the same priority. However, a network attack, a data object, and a privacy problem are classified into several ranges. The proposed off-chain blockchain enhances a regulation or data processing rule to be stored in a chain. PII information is stored in an off-chain, but a hash of the PII information is stored in a chain according to a global approval procedure. Such a point makes a manipulation difficult. For this reason, in a common example, to use a not-implemented and off-chain data storage and blockchain is legitimated.

Figure 7:
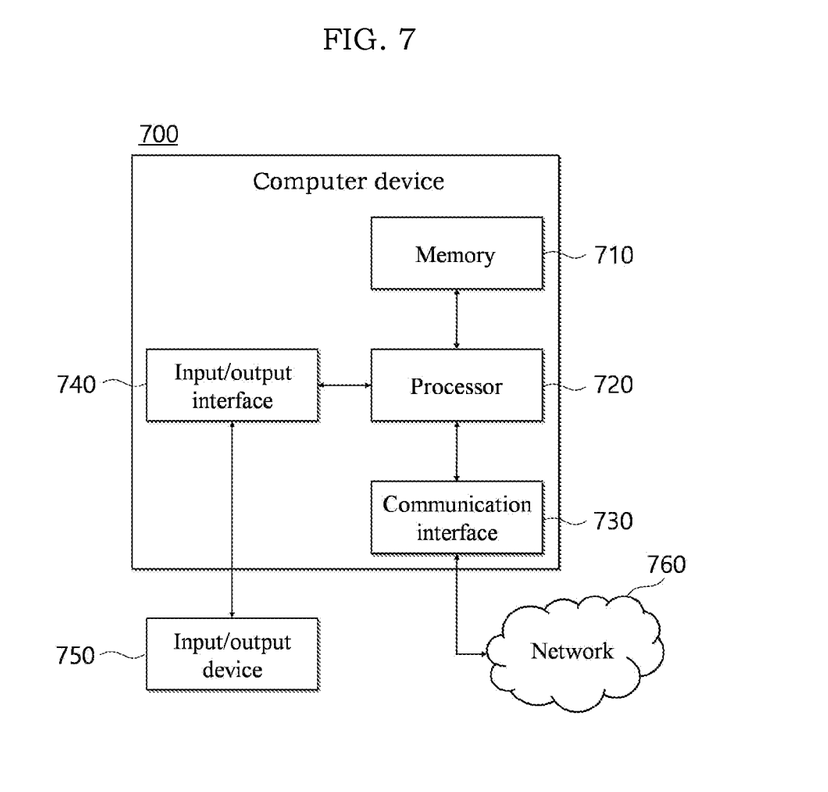
FIG. 7 is a diagram illustrating an example of an internal configuration of a computer device in an embodiment of the present disclosure.

FIG. 7 is a diagram illustrating an example of an internal configuration of a computer device in an embodiment of the present disclosure. Each of the aforementioned nodes may be performed by a computer device 700 described with reference to FIG. 7. As illustrated in FIG. 7, the computer device 700 may include a memory 710, a processor 720, a communication interface 730, and an input and output interface 740. The memory 710 is a computer-readable recording medium, and may include permanent mass storage devices, such as a random access memory (RAM), a read only memory (ROM) and a disk drive. In this case, the permanent mass storage device, such as a ROM and a disk drive, is a separate permanent storage device different from the memory 710, and may be included in the computer device 700. Furthermore, the memory 710 may store an operating system and at least one program code. Such software components may be loaded from a separate computer-readable recording medium different from the memory 710 to the memory 710. Such a separate computer-readable recording medium may include computer-readable recording media, such as a floppy drive, a disk, a tape, a DVD/CD-ROM drive, and a memory card. In other embodiments, the software components may be loaded onto the memory 710 through the communication interface 730, not a computer-readable recording medium. For example, software components may be loaded onto the memory 710 of the computer device 700 based on a computer program installed by files provided over a network 760.

The processor 720 may be configured to process instructions of a computer program by performing basic arithmetic, logic and input and output operations. The instructions may be provided to the processor 720 by the memory 710 or the communication interface 730. For example, the processor 720 may be configured to execute received instructions based on a program code stored in a recording device, such as the memory 710.

The communication interface 730 may provide a function for enabling the computer device 700 to communicate with another device (e.g., the aforementioned storage devices) over the network 760. For example, a request, an instruction, data, a file, etc. generated by the processor 720 of the computer device 700 in response to a program code stored in a recording device, such as the memory 710, may be transmitted to other devices through the communication interface 730 of the computer device 700 over the network 760 under the control of the communication interface 730. Inversely, a signal, an instruction, data, a file, etc. from other devices may be received by the computer device 700 through the communication interface 730 of the computer device 700 over the network 760. A signal, an instruction, data, etc. received through the communication interface 730 may be transmitted to the processor 720 or the memory 710, and a file, etc. may be stored in a storage medium (the aforementioned permanent storage device) which may be further included in the computer device 700.

The input and output interface 740 may be means for an interface with an input and output device 750. For example, the input device may include devices, such as a microphone, a keyboard, and a mouse. The output device may include devices, such as a display and a speaker. For another example, the input and output interface 740 may be means for an interface with a device in which functions for input and output are integrated into one, like a touch screen. The input and output device 750, together with the computer device 700, may be configured into a single device.

Furthermore, in other embodiments, the computer device 700 may include elements more than or less than those of FIG. 7. However, most of conventional technical components do not need to be clearly illustrated. For example, the computer device 700 may be implemented to include at least some of the aforementioned input and output devices 750 or may further include other elements, such as a transceiver and a database.

Figure 8:
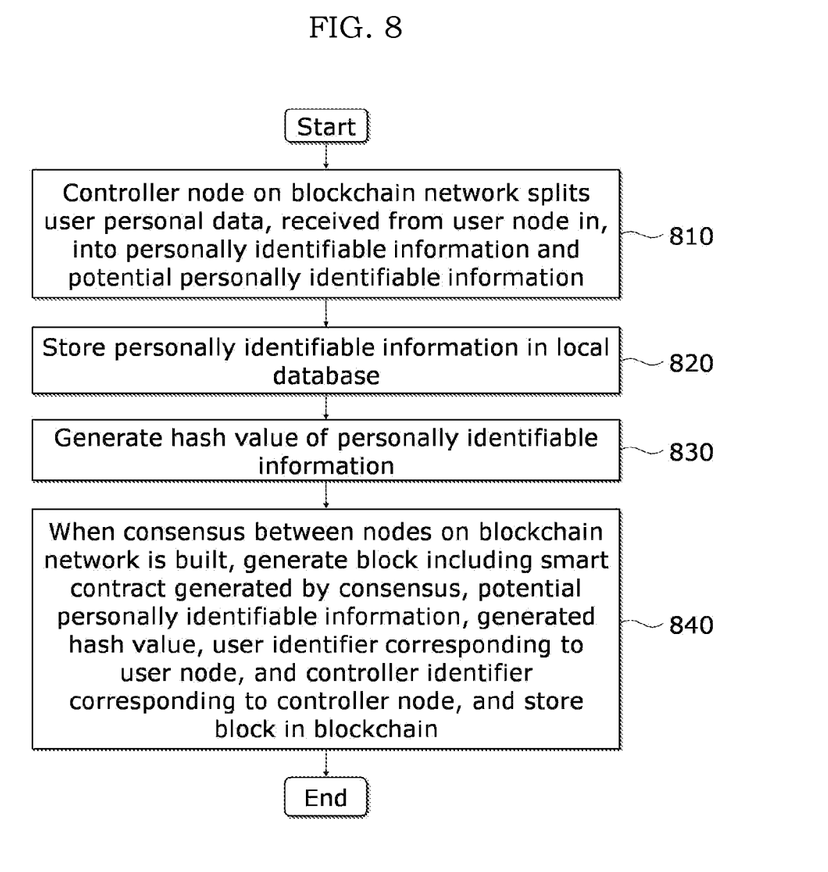
FIG. 8 is a flowchart illustrating an example of a personally identifiable information management method in an embodiment of the present disclosure.

FIG. 8 is a flowchart illustrating an example of a personally identifiable information management method in an embodiment of the present disclosure. The personally identifiable information management method according to the present embodiment may be performed by the computer device 700 described with reference to FIG. 7. In this case, the computer device 700 according to the present embodiment may implement a controller node on a blockchain network. For example, the processor 720 of the computer device 700 may be implemented to execute a control instruction according to a code of an operating system or a code of at least one computer program, which is included in the memory 710. In this case, the processor 720 may control the computer device 700 to perform steps 810 to 840, included in the method of FIG. 8, according to a control instruction provided by a code stored in the computer device 700.

In step 810, the computer device 700 may split user personal data, received from a user node in a controller node on a blockchain network, into personally identifiable information and potential personally identifiable information.

In step 820, the computer device 700 may store the personally identifiable information in a local database. As described already, the PII of the user personal data may be stored in the local database of the controller node. Hashes of such PII and PPII may be stored in the blockchain.

In step 830, the computer device 700 may generate a hash value of the personally identifiable information. The blockchain stores only the hash value of the PII. Accordingly, if the PII is deleted from the local database, the hash value of the PII stored in the blockchain is invalidated.

In step 840, when a consensus between nodes on the blockchain network is built, the computer device 700 may generate a block including a smart contract generated by the consensus, the potential personally identifiable information, the generated hash value, a user identifier corresponding to the user node, and a controller identifier corresponding to the controller node, and may store the block in the blockchain. At this time, the computer device 700 may post a list of the user personal data for the nodes on the blockchain network. Furthermore, a condition for the consensus may be based on General Data Protection Regulation (GDPR).

Meanwhile, if the computer device 700 shares user personal data with a processor node on a blockchain network, the computer device 700 may notify a user node of whether to share the user personal data and an object of sharing the user personal data. In this case, the processor node splits the user personal data into personally identifiable information and potential personally identifiable information, stores the personally identifiable information in a local database of the processor node, and generates a hash value of the personally identifiable information. If a consensus between nodes on the blockchain network is built, the computer device 700 may be implemented to generate a block, including a smart contract generated based on the consensus, the potential personally identifiable information, the generated hash value, a user identifier corresponding to the user node, a controller identifier corresponding to the controller node, and a processor identifier corresponding to the processor node, and to store the block in blockchain.

Furthermore, when a request to delete the user personal data is received from the user node, each of the nodes on the blockchain network may confirm the smart contract stored in the blockchain, and may delete the user personal data of the user node stored in its own local database.

Furthermore, when a request to modify the user personal data is received from the user node, each of the nodes on the blockchain network may confirm the smart contract stored in the blockchain and modify the user personal data of the user node stored in its own local database. At this time, the node that has modified the user personal data of the user node in its own local database may generate a new block including a hash of the modified personally identifiable information, and may add the new block to the blockchain.

As described above, according to embodiments of the present disclosure, a reliable PII life cycle can be guaranteed because both a local database and a distributed ledger are used.

The aforementioned system or device may be implemented by a hardware component, a software component or a combination of a hardware component and a software component. For example, the device and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, component, physical device, virtual equipment or computer storage medium or device in order to be interpreted by the processor or to provide an instruction or data to the processing device. The software may be distributed to computer systems connected over a network and may be stored or executed in a distributed manner. The software and the data may be stored in one or more computer-readable recording media.

The method according to an embodiment may be implemented in the form of a program instruction executable by various computer means and stored in a computer-readable medium. The computer-readable medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or storage media managed in a server. Examples of the program instruction may include machine-language code, such as a code written by a compiler, and a high-level language code executable by a computer using an interpreter.

As described above, although the embodiments have been described in connection with the limited embodiments and drawings, those skilled in the art may modify and change the embodiments in various ways from the description. For example, proper results may be achieved although the above descriptions are performed in order different from that of the described method and/or the aforementioned components, such as a system, a configuration, a device, and a circuit, are coupled or combined in a form different from that of the described method or replaced or substituted with other components or equivalents 다.

Accordingly, other implementations, other embodiments, and equivalents of the claims fall within the scope of the claims.

The invention claimed is:

1. A personally identifiable information management method of a blockchain based personally identifiable information management system (BcPIIMS), comprising:
    splitting, by a controller node on a blockchain network, user personal data received from a user node into personally identifiable information (PII) and potential personally identifiable information (PPII);
    storing, by the controller node, the personally identifiable information in a local database of the controller node;
    generating, by the controller node, a hash value of the personally identifiable information; and
    in response to a consensus between nodes on the blockchain network being built, generating a block comprising a smart contract generated based on the consensus, the potential personally identifiable information, the generated hash value, a user identifier corresponding to the user node and a controller identifier corresponding to the controller node, and storing the block in a blockchain; and
    when the controller node shares the user personal data with a processor node on the blockchain network, notifying, by the controller node, the user node of first information indicating whether to share the user personal data with the controller node and second information indicating a purpose of sharing the user personal data with the controller node.

2. The personally identifiable information management method of claim 1, further comprising posting, by the controller node, a list of the user personal data for the nodes on the blockchain network.

3. The personally identifiable information management method of claim 1, wherein the processor node is implemented to:
    split the user personal data into the personally identifiable information and the potential personally identifiable information,
    store the personally identifiable information in a local database of the processor node,
    generate the hash value of the personally identifiable information, and
    generate the block, comprising the smart contract generated based on the consensus, the potential personally identifiable information, the generated hash value, the user identifier corresponding to the user node, the controller identifier corresponding to the controller node and the processor identifier corresponding to the processor node, and store the block in the blockchain, when the consensus between the nodes on the blockchain network is built.

4. The personally identifiable information management method of claim 1, wherein a condition for the consensus is based on General Data Protection Regulation (GDPR).

5. The personally identifiable information management method of claim 1, wherein each of the nodes on the blockchain network confirms the smart contract stored in the blockchain when a request to delete the user personal data is received from the user node, and deletes the user personal data of the user node stored in its own local database.

6. The personally identifiable information management method of claim 1, wherein:
    each of the nodes on the blockchain network confirms the smart contract stored in the blockchain when a request to modify the user personal data is received from the user node, and modifies the user personal data of the user node stored in its own local database, and
    a node that has modified the user personal data of the user node in its own local database generates a new block comprising a hash of the modified personally identifiable information and adds the new block to the blockchain.

7. The personally identifiable information management method of claim 1, wherein the consensus is performed when the consensus between nodes of n (n is a natural number) percent or more among all the nodes on the blockchain network is built.

8. A non-transitory computer-readable recording medium on which a computer program for executing a personally identifiable information management method of a blockchain based personally identifiable information management system (BcPIIMS) is recorded,
    the method comprising:
    splitting, by a controller node on a blockchain network, user personal data received from a user node into personally identifiable information (PIT) and potential personally identifiable information (PPII);
    storing, by the controller node, the personally identifiable information in a local database of the controller node;
    generating, by the controller node, a hash value of the personally identifiable information; and
    in response that a consensus between nodes on the blockchain network is built, generating a block comprising a smart contract generated based on the consensus, the potential personally identifiable information, the generated hash value, a user identifier corresponding to the user node and a controller identifier corresponding to the controller node, and storing the block in a blockchain; and
    when the controller node shares the user personal data with a processor node on the blockchain network, notifying, by the controller node, the user node of first information indicating whether to share the user personal data with the controller node and second information indicating a purpose of sharing the user personal data with the controller node.

9. A computer device corresponding to a controller node on a blockchain network, comprising:
    at least one processor implemented to execute an instruction readable in a computer,
    wherein the at least one processor
    splits, into personally identifiable information (PII) and potential personally identifiable information (PPII), user personal data received from a user node on the blockchain network,
    stores the personally identifiable information in a local database,
    generates a hash value of the personally identifiable information,
    in response to a consensus between nodes on the blockchain network being built, generates a block comprising a smart contract generated based on the consensus, the potential personally identifiable information, the generated hash value, a user identifier corresponding to the user node and a controller identifier corresponding to a controller node, and stores the block in a blockchain; and
    wherein, when the controller node shares the user personal data with a processor node on the blockchain network, the controller node notifies the user node of first information indicating whether to share the user personal data with the controller node and second information indicating a purpose of sharing the user personal data with the controller node.

10. The computer device of claim 9, wherein the at least one processor posts a list of the user personal data for the nodes on the blockchain network.

11. The computer device of claim 9, wherein the processor node is implemented to:
    split the user personal data into the personally identifiable information and the potential personally identifiable information,
    store the personally identifiable information in a local database of the processor node,
    generate the hash value of the personally identifiable information, and
    generate the block, comprising the smart contract generated based on the consensus, the potential personally identifiable information, the generated hash value, the user identifier corresponding to the user node, the controller identifier corresponding to the controller node and the processor identifier corresponding to the processor node, and store the block in the blockchain, when the consensus between the nodes on the blockchain network is built.

12. The computer device of claim 9, wherein each of the nodes on the blockchain network confirms the smart contract stored in the blockchain when a request to delete the user personal data is received from the user node, and deletes the user personal data of the user node stored in its own local database.

13. The computer device of claim 9, wherein:
    each of the nodes on the blockchain network confirms the smart contract stored in the blockchain when a request to modify the user personal data is received from the user node, and modifies the user personal data of the user node stored in its own local database, and
    a node that has modified the user personal data of the user node in its own local database generates a new block comprising a hash of the modified personally identifiable information and adds the new block to the blockchain.

* * * * *

UNITED STATES PATENT AND TRADEMARK OFFICE
CERTIFICATE OF CORRECTION

PATENT NO. : 11,979,504 B2
APPLICATION NO. : 17/268389
DATED : May 7, 2024
INVENTOR(S) : Jin Hong Yang et al.

Page 1 of 1

It is certified that error appears in the above-identified patent and that said Letters Patent is hereby corrected as shown below:

In the Claims

| Column | Line | |
|---|---|---|
| 15 | 29 | change "(PIT)" to -- (PII) --. |

Signed and Sealed this
Eighteenth Day of November, 2025

John A. Squires
*Director of the United States Patent and Trademark Office*